US006908532B2

United States Patent
Steiner et al.

(10) Patent No.: US 6,908,532 B2
(45) Date of Patent: Jun. 21, 2005

(54) PRESS BELT

(75) Inventors: Karl Steiner, Herbrechtingen (DE); Uwe Matuschczyk, Geislingen (DE); Josef Muellner, Heidenheim (DE); Andreas Endters, Herbrechtingen (DE)

(73) Assignee: Voith Sulzer Papiermaschinen GmbH, Heidenheim (DE)

( * ) Notice: Subject to any disclaimer, the term of this patent is extended or adjusted under 35 U.S.C. 154(b) by 0 days.

(21) Appl. No.: 10/788,309

(22) Filed: Mar. 1, 2004

(65) Prior Publication Data
US 2004/0166300 A1 Aug. 26, 2004

Related U.S. Application Data

(63) Continuation of application No. 09/323,133, filed on Jun. 1, 1999, now abandoned.

(51) Int. Cl.$^7$ ............... D21F 3/02; D21F 7/08; B32B 5/12; B32B 5/08; B32B 27/01
(52) U.S. Cl. ........... 162/358.4; 162/901; 156/169; 156/181; 428/297.4; 428/298.1; 428/299.7; 428/300.7; 428/301.4; 428/113
(58) Field of Search ............... 162/348, 116, 162/117, 361, 358.2, 358.3, 358.4, 900–903; 156/166–181; 474/260, 261; 198/846, 847; 428/292.1, 295.1, 295.4, 297.1, 297.4, 297.7, 298.1, 299.7, 300.2, 301.4, 113, 114

(56) References Cited

U.S. PATENT DOCUMENTS

| 3,302,251 | A | | 2/1967 | Schiel et al. | |
| 4,238,287 | A | * | 12/1980 | Gill | 162/358.4 |
| 4,946,731 | A | | 8/1990 | Dutt | |
| 5,033,207 | A | | 7/1991 | Sturm et al. | |
| 5,086,571 | A | | 2/1992 | Hietanen | |
| 5,115,581 | A | | 5/1992 | Viitanen | |
| 5,118,391 | A | | 6/1992 | Matuschczyk et al. | |
| 5,134,010 | A | | 7/1992 | Schiel | |
| 5,298,124 | A | | 3/1994 | Eklund et al. | |
| 5,320,702 | A | | 6/1994 | Matuschczyk et al. | |
| 5,341,579 | A | | 8/1994 | Schiel et al. | |
| 5,472,573 | A | | 12/1995 | Schiel et al. | |
| 5,626,723 | A | | 5/1997 | Schiel et al. | |
| 5,968,318 | A | * | 10/1999 | Hasegawa et al. | 162/358.4 |
| 6,086,719 | A | * | 7/2000 | Hasegawa et al. | 162/358.4 |
| 6,284,102 | B1 | * | 9/2001 | Inoue et al. | 162/358.4 |
| 6,391,159 | B2 | * | 5/2002 | Schon | 162/358.4 |

FOREIGN PATENT DOCUMENTS

| DE | 4022800 | 9/1991 |
| DE | 9201143 | 5/1992 |
| DE | 4202731 | 8/1993 |
| EP | 0420372 | 4/1991 |
| EP | 0469338 | 2/1992 |
| WO | 88/08897 | 11/1988 |

* cited by examiner

Primary Examiner—Eric Hug
(74) Attorney, Agent, or Firm—Greenblum & Bernstein, P.L.C.

(57) ABSTRACT

A press belt for the formation of a nip between the belt and an opposing surface during processing of a fibrous pulp web, that includes a matrix of an elastomer material, a first layer of reinforcing fibers having a thickness and spacings therebetween, and extending in a direction transverse to a belt run direction, and a second layer of reinforcing fibers having a thickness and spacings therebetween, and extending in the belt run direction, where the thicknesses of the reinforcing fibers of the first layer and the second layer is about 0.5 mm, where the spacings between the reinforcing fibers of the first layer are less than or equal to about 3.0 mm, where the spacings between the reinforcing fibers of the second layer being less than or equal to 2.5 mm, and where the reinforcing fibers of the first layer are separated in a belt thickness direction from the reinforcing fibers of the second layer one layer by a distance of up to about 4 mm.

21 Claims, 1 Drawing Sheet

PRESS BELT

CROSS-REFERENCE TO RELATED APPLICATION

The present application is a continuation of U.S. patent application Ser. No. 09/323,133 filed Jun. 1, 1999, now abandoned, the disclosure of which is expressly incorporated by reference herein in its entirety. Further, the instant application contains subject matter related to U.S. application Ser. No. 09/023,706 filed Feb. 13, 1998, now abandoned, which claims priority of German Application No. 19706 097.8 filed Feb. 17, 1997, the disclosures of which are expressly incorporated by reference herein in their entireties.

BACKGROUND INFORMATION

Field of the Invention

The invention relates to a press belt, in particular a press jacket, for the formation of at least one nip lying between the circulating belt and a corresponding opposing surface for treating a fibrous pulp web, in particular a paper and/or cardboard web. The press belt includes a matrix of an elastomer material and at least two layers of reinforcing fibers which strengthen the matrix.

BACKGROUND INFORMATION

Field of the Invention

A reinforced press belt, for example, can be used in a shoe press, and in particular can serve to form at least one elongated nip in a belt run direction, where it is pressed by a press shoe against a corresponding opposing surface. If the shoe press unit is designed as a shoe press roll, the press belt can serve as a press jacket.

Due to the high strain which arises in a nip, reinforcement of the press belt matrix is essential. Moreover, the quality of the bond between the reinforcement material and the matrix determines the life span of the press belt to a great extent. Furthermore, insufficient stability between the reinforcement material and the matrix can impair constancy of performance of the press belt and can lead to poor run quality.

SUMMARY OF THE INVENTION

To create a press belt, in particular a press jacket, which is optimized with respect to reinforcement and bonding between a reinforcement material and a belt matrix, and which has improved stability, a press belt is provided that includes a layer of reinforcing fibers which extend transversely to a belt run direction, and a layer of reinforcing fibers which extend in the belt run direction. The respective thicknesses of the reinforcing fibers of at least one layer is greater than or equal to about 1 mm, and preferably, the thicknesses of the fibers of both layers are greater than or equal to 1 mm, the first layer of reinforcing fibers and the second layer of reinforcing fibers being at least partially embedded in the matrix; the spacings between the reinforcing fibers extending in the transverse direction are less than or equal to about 3 mm, and the spacings between the reinforcing fibers extending in the belt run direction are less than or equal to about 2.5 mm. Furthermore, the reinforcing fibers of one layer are separated from those of another layer by a distance in the belt thickness (i.e., radial) direction of up to about 4 mm.

With such a design, heightened consistency of performance and improved run quality of the press belts are attained, as is a longer belt life span.

The present invention is directed to a process for forming a press belt. The process includes at least partially embedding a first layer of reinforcing fibers having a thickness and spacings between the fibers, and extending in a direction transverse to a belt run direction in a matrix including an elastomer material, and at least partially embedding a second layer of reinforcing fibers having a thickness and spacings between the fibers, and extending in the belt run direction in the matrix material. The thicknesses of the reinforcing fibers of at least one of the first layer and the second layer are greater than or equal to about 1 mm, the spacings between the reinforcing fibers of the first layer are less than or equal to about 3.0 mm, and the spacings between the reinforcing fibers of the second layer are less than or equal to 2.5 mm. The process also includes maintaining a separation of up to about 4 mm in a belt thickness direction of the reinforcing fibers of the first layer from the reinforcing fibers of the second layer, and maintaining a volume ratio between a volume of the reinforcing fibers in the second layer and a volume of the reinforcing fibers in the first layer that is greater than or equal to 1 and less than about 1.5.

The present invention is also directed to a process for forming a press belt that includes at least partially embedding a first layer of reinforcing fibers having a thickness and spacings between the fibers, and extending in a direction transverse to a belt run direction in a matrix including an elastomer material, and at least partially embedding a second layer of reinforcing fibers having a thickness and spacings between the fibers, and extending in the belt run direction in the matrix material. The thicknesses of the reinforcing fibers of at least one of the first layer and the second layer are greater than or equal to about 1 mm, the spacings between the reinforcing fibers of the first layer are less than or equal to about 3.0 mm, and the spacings between the reinforcing fibers of the second layer are less than or equal to 2.5 mm. The process also includes maintaining a separation of up to about 4 mm in a belt thickness direction of the reinforcing fibers of the first layer from the reinforcing fibers of the second layer, and maintaining a volume ratio between a volume of the reinforcing fibers in the first layer and the second layer, and a volume of the matrix that is greater than or equal to 0.2.

In accordance with a feature of the instant invention, the process can also include roughening the surface of the reinforcing fibers before at least partially embedding them in the matrix material.

According to one embodiment of the invention, the ratio of the volume of the reinforcing fibers extending in the belt run direction and the volume of the reinforcing fibers extending in the transverse direction (i.e., the direction transverse to the web run direction) is in the range of from about 1 to about 1.5.

According to another aspect of the invention, the ratio of the volume of the fibrous reinforcement material and the volume of the matrix material is greater than or equal to 0.2.

According to yet another aspect of the invention, the reinforcing fibers can have, at least in part, a textured, structured and/or a roughened surface, in order to ensure better bonding to the matrix. An enlarged surface area results in the improved bond.

According to yet another aspect of the invention, the layers of reinforcing fibers are completely embedded in the matrix material.

The present invention provides a press belt for the formation of a nip between the belt and an opposing surface during processing of a fibrous pulp web, which includes a matrix of an elastomer material, a first layer of reinforcing fibers having a thickness and spacings between the fibers, and extending in a direction transverse to a belt run direction, and a second layer of reinforcing fibers having a thickness and spacings between the fibers, and extending in the belt run direction, where the thicknesses of the reinforcing fibers of at least one of the first layer and the second layer are greater than or equal to about 1 mm, the first layer of reinforcing fibers and the second layer of reinforcing fibers being at least partially embedded in the matrix where the spacings between the reinforcing fibers of the first layer are less than or equal to about 3.0 mm, where the spacings between the reinforcing fibers of the second layer being less than or equal to 2.5 mm, and where the reinforcing fibers of the first layer being separated in a belt thickness direction from the reinforcing fibers of the second layer one layer by a distance of up to about 4 mm. Preferably, the thicknesses of the reinforcing fibers of each of the first layer and the second layer are greater than or equal to about 1 mm.

According to the present invention, a volume ratio between a volume of the reinforcing fibers in the second layer and a volume of the reinforcing fibers in the first layer is in the range of from about 1 to about 1.5. Further, a volume ratio between a volume of the reinforcing fibers in the first layer and the second layer, and a volume of the matrix, is greater than or equal to 0.2. The press belt also may include the reinforcing fibers having a surface that is roughened, textured or fibrous. Moreover, the first and second layers may be completely embedded in the matrix. Further, the press belt may be a press jacket. The fibrous web may be a paper and/or cardboard web.

The present invention also provides a press belt for the formation of a nip between the belt and an opposing surface during processing of a fibrous pulp web that includes a matrix of an elastomer material, a first layer of reinforcing fibers having a thickness and spacings between the fibers and extending in a direction transverse to a belt run direction, a second layer of reinforcing fibers having a thickness and spacings between the fibers and extending in the belt run direction, the first layer of reinforcing fibers and the second layer of reinforcing fibers being at least partially embedded in the matrix; and a volume ratio between a volume of the reinforcing fibers in the second layer and a volume of the reinforcing fibers in the first layer, where the volume ratio is in the range of from about 1 to about 1.5. The thicknesses of the reinforcing fibers of the first layer and the second layer may be greater than about 1 mm. Moreover, the spacings between the reinforcing fibers of the first layer may be less than or equal to about 3.0 mm, and/or the spacings between the reinforcing fibers of the second layer may be less than or equal to 2.5 mm. The reinforcing fibers of the first layer of the press belt may be separated in a belt thickness direction (i.e., radial direction) from the reinforcing fibers of the second layer by a distance of up to about 4 mm.

According to yet another aspect of the invention, a press belt is provided for the formation of a nip between the belt and an opposing surface during processing of a fibrous pulp web that includes a matrix of an elastomer material, a first layer of reinforcing fibers having a thickness and spacings between the fibers and extending in a direction transverse to a belt run direction, a second layer of reinforcing fibers having a thickness and spacings between the fibers and extending in the belt run direction; the first layer of reinforcing fibers and the second layer of reinforcing fibers being at least partially embedded in the matrix; a volume of the reinforcing fibers in the second layer and a volume of the reinforcing fibers in the first layer, where the volume ratio is in the range of from about 1 to about 1.5.; and a volume ratio between a volume of the reinforcing fibers in the first layer and the second layer, and a volume of the matrix, where the volume ratio is greater than or equal to 0.2. The thicknesses of the reinforcing fibers of the first layer and the second layer may be greater than or equal to about 1 mm. Moreover, the spacings between the reinforcing fibers of the first layer may be less than or equal to about 3.0 mm, and/or the spacings between the reinforcing fibers of the second layer may be less than or equal to 2.5 mm. The reinforcing fibers of the first layer may be separated in a belt thickness direction (i.e., radial direction) from the reinforcing fibers of the second layer by a distance of up to about 4 mm.

Further, the aforementioned and following characteristic features of the present invention can be used not only in the described combinations, but also in other combinations or alone, without departing from the scope of the invention. Further embodiments and advantages can be seen from the detailed description and the accompanying Figures.

BRIEF DESCRIPTION OF THE DRAWINGS

The present invention is further described in the detailed description which follows, in reference to the noted drawings by way of non-limiting examples of preferred embodiments of the present invention, wherein the same reference numerals represent similar parts throughout the drawings, and wherein.

DETAILED DESCRIPTION OF THE INVENTION

Figure 1:
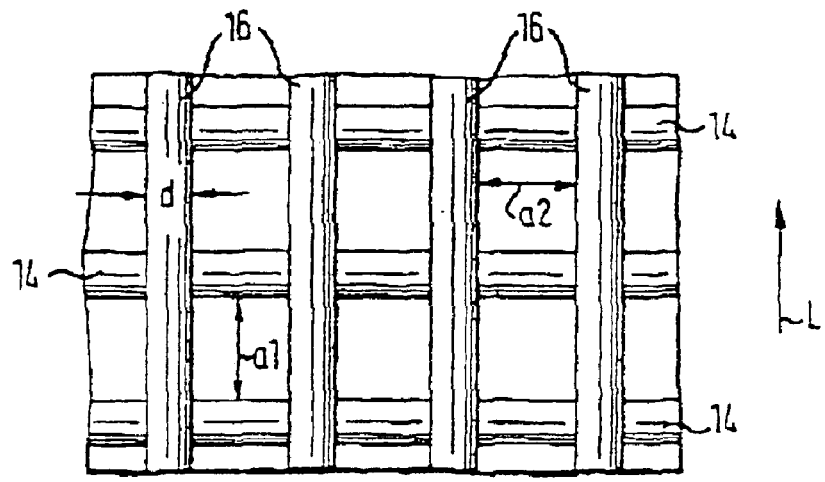
FIG. 1 is a schematic top-view of a section of the reinforcement material embedded in the matrix of a press belt.

The particulars shown herein are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for the fundamental understanding of the invention, the description taken with the drawing making apparent to those skilled in the art how the several forms of the invention may be embodied in practice.

Figure 2:
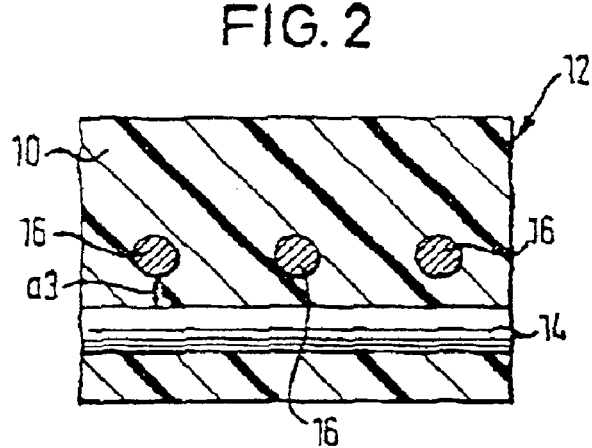
FIG. 2 is a schematic cross-sectional view of a segment of the press belt of FIG. 1, intersected in the radial direction.

FIG. 1 shows a schematic top-view a section of the reinforcement material which, as shown in FIG. 2, is embedded in the matrix 10 (at least one of the first layer of reinforcing fibers and the second layer of reinforcing fibers is at least partially embedded in the matrix) of a press belt (depicted here as a press jacket 12) which includes an elastomer material, such as polyurethane. A press jacket 12 of this type can serve to form at least one nip between the circulating belt and a corresponding opposing surface, through which a fibrous pulp web is guided, such as a paper and/or a cardboard web. (at least one of the first layer of reinforcing fibers and the second layer of reinforcing fibers being at least partially embedded in the matrix)

As shown in FIGS. 1 and 2, two layers that reinforce matrix 10 are fitted with reinforcing fibers 14, 16. Reinforcing fibers 14, 16 may be composed of polyamid or polyester.

The layer which lies radially inside is formed by reinforcing fibers 14 which are substantially parallel to each other and which extend transversely to the belt or jacket run direction L, and therefore, extend transversely to the peripheral direction of the press jacket 12. In other words, reinforcing fibers 14 extend in the longitudinal direction of press jacket 12. In contrast, substantially parallel reinforcing fibers 16 of the layer which lies radially outside extend in a peripheral (circumferential) direction L of the press jacket. However, the layers may also be arranged the other way around. As used herein the terms "peripheral direction" and "circumferential direction" are intended to be interchangeable. Further, as used herein the terms "run direction L" and "peripheral (circumferential) direction L" are also intended to be interchangeable.

The respective thickness d of reinforcing fibers 14, and of reinforcing fibers 16, is at least about 0.5 mm, preferably greater than or equal to about 1 mm.

Distance a1 between substantially parallel reinforcing fibers 14, i.e., the reinforcing fibers extending in the transverse direction, is up to about 3 mm. In contrast, the distance a2 between substantially parallel reinforcing fibers 16, i.e., the reinforcing fibers extending the peripheral direction L, is less than or equal to about 2.5 mm. In addition, reinforcing fibers 16 (which lie radially farther out as shown in FIG. 2) are separated a distance a3 in the belt (or jacket) thickness direction (i.e., radial direction) from reinforcing fibers 14 (which lie radially closer in). The distance a3 between the reinforcing fibers in the radial direction lies in the range of about 0 to about 4 mm.

A ratio between a volume of reinforcing fibers 16 extending in peripheral direction L, and a volume of the reinforcing fibers 14 extending in a transverse (longitudinal) direction, is greater than or equal to 1, preferably in the range of from about 1 to about 1.5.

In addition, a ratio between a volume of the fibrous materials of the reinforcement material composing fibers 14 and 16, and the volume of the matrix material, is greater than or equal to 0.2.

Figure 3:
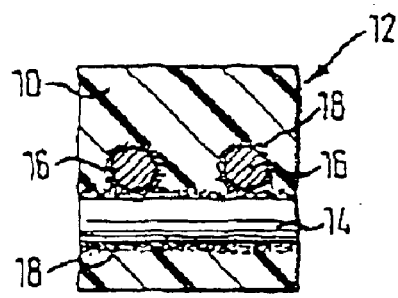
FIG. 3 is a schematic cross-sectional view of a segment of another embodiment of the press belt including the reinforcement material, intersected in the radial direction.

FIG. 3 illustrates a schematic cross-sectional view of a segment of another embodiment of press jacket 12 fitted with a reinforcement. In this case, reinforcing fibers 14, 16 have a fibrous (i.e., roughened or textured) surface 18, through which improved bonding to matrix 10 is facilitated. Surface 18 is roughened by a mechanical process between two rolls.

In FIG. 3, the radial distance between reinforcing fibers 14 and reinforcing fibers 16 is less than in FIG. 2. In all other respects, however, these embodiments of the invention illustrated in these Figures have the same basic construction. In both cases, the layers of reinforcing fibers 14, 16 are preferably completely embedded in the matrix material.

It is noted that the foregoing examples have been provided merely for the purpose of explanation and are in no way to be construed as limiting of the present invention. While the invention has been described with reference to a preferred embodiment, it is understood that the words which have been used herein are words of description and illustration, rather than words of limitation. Changes may be made, within the purview of the appended claims, as presently stated and as amended, without departing from the scope and spirit of the invention in its aspects. Although the invention has been described herein with reference to particular materials and embodiments, the invention is not intended to be limited to the particulars disclosed herein; rather, the invention extends to a functionally equivalent structures, methods and uses, such as are within the scope of the appended claims.

What is claimed:

1. A process for forming a press belt, comprising:

at least partially embedding a first layer of reinforcing fibers having a thickness and spacings between the fibers, and extending in a direction transverse to a belt run direction in a matrix including an elastomer material;

at least partially embedding a second layer of reinforcing fibers having a thickness and spacings between the fibers, and extending in the belt run direction in the matrix material, wherein the thicknesses of the reinforcing fibers of at least one of the first layer and the second layer are greater than or equal to about 1 mm, the spacings between the reinforcing fibers of the first layer are less than or equal to about 3.0 mm, and the spacings between the reinforcing fibers of the second layer are less than or equal to 2.5 mm; and maintaining a separation of up to about 4 mm in a belt thickness direction of the reinforcing fibers of the first layer from the reinforcing fibers of the second layer; and maintaining a volume ratio between a volume of the reinforcing fibers in the second layer and a volume of the reinforcing fibers in the first layer that is greater than or equal to 1 and less than about 1.5.

2. A process for forming a press belt, comprising:

at least partially embedding a first layer of reinforcing fibers having a thickness and spacings between the fibers, and extending in a direction transverse to a belt run direction in a matrix including an elastomer material;

at least partially embedding a second layer of reinforcing fibers having a thickness and spacings between the fibers, and extending in the belt run direction in the matrix material, wherein the thicknesses of the reinforcing fibers of at least one of the first layer and the second layer are greater than or equal to about 1 mm, the spacings between the reinforcing fibers of the first layer are less than or equal to about 3.0 mm, and the spacings between the reinforcing fibers of the second layer are less than or equal to 2.5 mm; and maintaining a separation of up to about 4 mm in a belt thickness direction of the reinforcing fibers of the first layer from the reinforcing fibers of the second layer; and maintaining a volume ratio between a volume of the reinforcing fibers in the first layer and the second layer, and a volume of the matrix that is greater than or equal to 0.2.

3. The process in accordance with claim 2, further comprising roughening the surface of the reinforcing fibers before at least partially embedding them in the matrix material.

4. A press belt for the formation of a nip between the belt and an opposing surface during processing of a fibrous pulp web, comprising:

a matrix including an elastomer material;

a first layer of reinforcing fibers having a thickness and spacings between the fibers, and extending in a direction transverse to a belt run direction;

a second layer of reinforcing fibers having a thickness and spacings between the fibers, and extending in the belt run direction;

the first layer of reinforcing fibers and the second layer of reinforcing fibers being at least partially embedded in the matrix;

the thicknesses of the reinforcing fibers of at least one of the first layer and the second layer being greater than or equal to about 1 mm;

the spacings between the reinforcing fibers of the first layer being less than or equal to about 3.0 mm;

the spacings between the reinforcing fibers of the second layer being less than or equal to 2.5 mm; and the reinforcing fibers of the first layer being separated in a belt thickness direction from the reinforcing fibers of the second layer by a distance of up to about 4 mm, wherein a volume ratio between a volume of the reinforcing fibers in the second layer and a volume of the reinforcing fibers in the first layer is greater than or equal to 1 and less than about 1.5.

5. A press belt for the formation of a nip between the belt and an opposing surface during processing of a fibrous pulp web, comprising:

a matrix including an elastomer material;

a first layer of reinforcing fibers having a thickness and spacings between the fibers, and extending in a direction transverse to a belt run direction;

a second layer of reinforcing fibers having a thickness and spacings between the fibers, and extending in the belt run direction;

the first layer of reinforcing fibers and the second layer of reinforcing fibers being at least partially embedded in the matrix;

the thicknesses of the reinforcing fibers of at least one of the first layer and the second layer being greater than or equal to about 1 mm;

the spacings between the reinforcing fibers of the first layer being less than or equal to about 3.0 mm;

the spacings between the reinforcing fibers of the second layer being less than or equal to 2.5 mm; and the reinforcing fibers of the first layer being separated in a belt thickness direction from the reinforcing fibers of the second layer by a distance of up to about 4 mm, wherein a volume ratio between a volume of the reinforcing fibers in the first layer and the second layer, and a volume of the matrix, is greater than or equal to 0.2.

6. The press belt according to claim 5, further comprising; the reinforcing fibers having a surface; and the surface being roughened.

7. The press belt according to claim 5, further comprising the first layer and the second layer being completely embedded in the matrix.

8. The press belt according to claim 5, the press belt comprising a press jacket.

9. The press belt according to claim 5, the fibrous web comprising at least one of a paper web and a cardboard web.

10. The press belt according to claim 5, wherein the thicknesses of the reinforcing fibers of each of the first layer and the second layer being greater than or equal to about 1 mm.

11. A press belt for the formation of a nip between the belt and an opposing surface during processing of a fibrous pulp web, comprising:

a matrix including an elastomer material;

a first layer of reinforcing fibers having a thickness and spacings between the fibers, and extending in a direction transverse to a belt run direction;

a second layer of reinforcing fibers having a thickness and spacings between the fibers, and extending in the belt run direction; and the first layer of reinforcing fibers and the second layer of reinforcing fibers being at least partially embedded in the matrix;

a volume ratio between a volume of the reinforcing fibers in the second layer and a volume of the reinforcing fibers in the first layer, wherein the volume ratio is in the range of from 1 to about 1.5.

12. The press belt according to claim 11, further comprising the thicknesses of the reinforcing fibers of at least one of the first layer and the second layer being greater than or equal to about 1 mm.

13. The press belt according to claim 12, wherein the thicknesses of the reinforcing fibers of each of the first layer and the second layer being greater than or equal to about 1 mm.

14. The press belt according to claim 11, further comprising the spacings between the reinforcing fibers of the first layer being less than or equal to about 3.0 mm.

15. The press belt according to claim 11, further comprising the spacings between the reinforcing fibers of the second layer being less than or equal to 2.5 mm.

16. The press belt according to claim 11, further comprising the reinforcing fibers of the first layer being separated in a belt thickness direction from the reinforcing fibers of the second layer by a distance of up to about 4 mm.

17. A press belt for the formation of a nip between the belt and an opposing surface during processing of a fibrous pulp web, comprising:

a matrix including an elastomer material;

a first layer of reinforcing fibers having a thickness and spacings between the fibers, and extending in a direction transverse to a belt run direction;

a second layer of reinforcing fibers having a thickness and spacings between the fibers, and extending in the belt run direction;

the first layer of reinforcing fibers and the second layer of reinforcing fibers being at least partially embedded in the matrix;

a volume ratio between a volume of the reinforcing fibers in the second layer and a volume of the reinforcing fibers in the first layer, wherein the volume ratio is in the range of from 1 to about 1.5; and a volume ratio between a volume of the reinforcing fibers in the first layer and the second layer, and a volume of the matrix, wherein the volume ratio is greater than or equal to 0.2.

18. The press belt according to claim 17, further comprising the thicknesses of the reinforcing fibers of the first layer and the second layer being greater than or equal to about 1 mm.

19. The press belt according to claim 17, further comprising the spacings between the reinforcing fibers of the first layer being less than or equal to about 3.0 mm.

20. The press belt according to claim 18, further comprising the spacings between the reinforcing fibers of the second layer being less than or equal to 2.5 mm.

21. The press belt according to claim 17, further comprising the reinforcing fibers of the first layer being separated in a belt thickness direction from the reinforcing fibers of the second layer by a distance of up to about 4 mm.

* * * * *